(12) United States Patent
Kodanev et al.

(10) Patent No.: US 9,158,069 B2
(45) Date of Patent: Oct. 13, 2015

(54) CHARGE-DISCHARGE ELECTRO-OPTICAL MICRORING MODULATOR

(71) Applicant: Technion Research & Development Foundation Ltd., Haifa (IL)

(72) Inventors: Anna Kodanev, Nesher (IL); Meir Orenstein, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 14/249,399

(22) Filed: Apr. 10, 2014

(65) Prior Publication Data

US 2014/0307999 A1    Oct. 16, 2014

Related U.S. Application Data

(60) Provisional application No. 61/811,819, filed on Apr. 15, 2013.

(51) Int. Cl.
*G02B 6/26* (2006.01)
*G02B 6/122* (2006.01)
*G02B 6/12* (2006.01)
*G02B 6/293* (2006.01)
*G02F 1/225* (2006.01)

(52) U.S. Cl.
CPC .......... *G02B 6/1226* (2013.01); *G02B 6/12007* (2013.01); *G02B 6/1228* (2013.01); *G02B 6/29338* (2013.01); *G02F 1/2257* (2013.01); *G02F 2203/15* (2013.01); *Y10T 29/49826* (2015.01); *Y10T 29/49885* (2015.01)

(58) Field of Classification Search
CPC ............. G02B 6/12007; G02B 6/1226; G02B 6/1228; G02B 6/29338; G02B 6/12; Y10T 29/49885
USPC ................................................ 385/27; 29/428
See application file for complete search history.

(56) References Cited

U.S. PATENT DOCUMENTS 5,469,460 A * 11/1995 Van Roijen et al. ............ 372/94
6,885,689 B2 * 4/2005 Margalit et al. ............ 372/46.01

(Continued)

OTHER PUBLICATIONS

Xu et al., "Micrometre-scale silicon electro-optic modulator", Nature, vol. 435, pp. 325-327, May 19, 2005.

(Continued)

*Primary Examiner* — Peter Radkowski
(74) *Attorney, Agent, or Firm* — D. Kliger I.P. Services Ltd.

(57) ABSTRACT

An apparatus includes an optical ring resonator, first and second optical couplers, and control circuitry. The first optical coupler is configured to modulate an input optical signal traversing an optical waveguide, by tuning cross-coupling of energy between the optical waveguide and the ring resonator with a first variable coupling coefficient. The second optical coupler is configured to tune cross-coupling of energy between the ring resonator and an auxiliary optical signal, different from the input optical signal, with a second variable coupling coefficient. The control circuitry is configured to modulate the first coupling coefficient with a first control signal so as to modulate the input optical signal, and to modulate the second coupling coefficient with a second control signal, so as to retain a constant electrical-field complex envelope in the ring resonator.

18 Claims, 3 Drawing Sheets

(56) References Cited

U.S. PATENT DOCUMENTS

| | | | | |
|---|---|---|---|---|
| 7,123,800 | B2* | 10/2006 | Kaplan | 385/50 |
| 7,587,105 | B2* | 9/2009 | Ashkenazi et al. | 385/13 |
| 7,738,527 | B2* | 6/2010 | He | 372/94 |
| 8,019,185 | B2* | 9/2011 | Yap | 385/3 |
| 8,244,077 | B1* | 8/2012 | Yap | 385/3 |
| 8,483,521 | B2 | 7/2013 | Popovic | |
| 8,483,527 | B2* | 7/2013 | Mandorlo et al. | 385/32 |
| 2005/0196103 | A1* | 9/2005 | Kaplan | 385/50 |
| 2008/0095490 | A1* | 4/2008 | Ashkenazi et al. | 385/13 |
| 2008/0123701 | A1* | 5/2008 | He | 372/23 |
| 2009/0208162 | A1* | 8/2009 | Yap | 385/3 |
| 2011/0243501 | A1* | 10/2011 | Mandorlo et al. | 385/32 |

OTHER PUBLICATIONS

Lipson, M., "Compact Electro-Optic Modulators on a Silicon Chip", IEEE Journal of Selected Topics in Quantum Electronics, vol. 12, No. 6, pp. 1520-1526, Nov./Dec. 2006.

Li et al., "Coupled-ring-resonator-based silicon modulator for enhanced performance", Optics Express, vol. 16, issue 17, pp. 13342-13348, Aug. 2008.

Popovic, M., "Resonant optical modulators beyond conventional energy efficiency and modulation frequency limitations", Conference on Integrated Photonics Research, Silicon and Nanophotonics, 3 pages, Monterey, USA, Jul. 25-28, 2010.

Sacher et al., "Dynamics of microring resonator modulators", Optics Express, vol. 16, issue 20, pp. 15741-15753, Sep. 2008.

Sacher et al., "Characteristics of Microring Resonators With Waveguide-Resonator Coupling Modulation", Journal of Lightwave Technology, vol. 27, No. 17, pp. 3800-3811, Sep. 1, 2009.

Yariv, A., "Universal relations for coupling of optical power between microresonators and dielectric waveguides", Electronics Letters, vol. 26, No. 4, pp. 321-322, Feb. 2000.

Yariv, A., "Critical Coupling and Its Control in Optical Waveguide-Ring Resonator Systems", IEEE Photonics Technology Letters, vol. 14, No. 4, pp. 483-485, Apr. 2002.

Sacher et al., "Coupling modulation of microrings at rates beyond the linewidth limit", Optics Express, vol. 21, No. 8, pp. 9722-9733, Apr. 22, 2013.

Song et al., "Nonlinear Distortion in a Silicon Microring-Based Electro-Optic Modulator for Analog Optical Links", IEEE Journal of Selected Topics in Quantum Electronics, vol. 16, No. 1, pp. 185-191, Jan./Feb. 2010.

Kodanev et al., "High-speed Digital and Analog Charge-Discharge Microring Modulator Not Limited by Q-factor", CLEO: Science and Innovations, San Jose, USA, Jun. 9-14, 2013.

Ginzburg et al., "Gap plasmon polariton structure for very efficient microscale-to-nanoscale interfacing", Optics Letters, vol. 31, issue 22, pp. 3288-3290, Nov. 15, 2006.

Gramotnev et al., "Plasmonics beyond the diffraction limit", Nature Photonics, vol. 4, pp. 83-91, Feb. 2010.

Vedantam et al.,"A Plasmonic Dimple Lens for Nanoscale Focusing of Light", NANO Letters, vol. 9, No. 10, pp. 3447-3452, year 2009.

Jakes, W.C., "Antenna Engineering Handbook", chapter 10, pp. 280-338, published by McGraw-Hill, year 1961.

Barnes et al., "Surface plasmon subwavelength optics", Nature, issue 424, pp. 824-830, Aug. 14, 2003.

Barrios et al., "Modeling and analysis of high-speed electro-optic modulation in high confinement silicon waveguides using metal-oxide-semiconductor configuration", Journal of Applied Physics, vol. 96, No. 11, pp. 6007-6015, Dec. 1, 2004.

Sacher et al., "Controlled coupling in silicon microrings for high-speed, high extinction ratio, and low-chirp modulation", 2011 Conference on Lasers and Electro-Optics (CLEO), 2 pages, Baltimore, USA, May 1-6, 2011.

* cited by examiner

CHARGE-DISCHARGE ELECTRO-OPTICAL MICRORING MODULATOR

CROSS-REFERENCE TO RELATED APPLICATIONS

This application claims the benefit of U.S. Provisional Patent Application 61/811,819, filed Apr. 15, 2013, whose disclosure is incorporated herein by reference.

FIELD OF THE INVENTION

The present invention relates generally to Electro-Optical (EO) devices, and particularly to EO modulators.

BACKGROUND OF THE INVENTION

Electro-Optical (EO) modulators are an important building block in optical communication systems, optical sensors and other applications. Some EO modulators are based on microring configurations, and various microring modulators are known in the art.

Microring modulators are described, for example, by Xu et al., in "Micrometer-Scale Silicon Electro-Optic Modulator," Nature, volume 435, no. 7040, May, 2005, pages 325-327; by Lipson, in "Compact Electro-Optic Modulators on a Silicon Chip," IEEE Journal of Selected Topics in Quantum Electronics, volume 12, no. 6, December, 2006, pages 1520-1526; by Li et al., in "Coupled-Ring-Resonator-Based Silicon Modulator for Enhanced Performance," Optics Express, volume 16, no. 17, August, 2008, pages 13342-13348; and by Popović, in "Resonant Optical Modulators Beyond Conventional Energy-Efficiency and Modulation frequency Limitations," IEEE Photonics Technology Letters, volume 14, no. 4, April, 2012, pages 483-485, which are all incorporated herein by reference.

U.S. Pat. No. 8,483,521, whose disclosure is incorporated herein by reference, describes techniques for cavity dynamics compensation in resonant optical modulators. In some disclosed embodiments, a resonant optical modulator includes an optical resonator, a first port optically coupled to the optical resonator with a first time-variable coupling rate, a second port optically coupled to the optical resonator with a second time-variable coupling rate, and a driver for simultaneously modulating the first and second time-variable coupling rates such that a photon population in the optical resonator is substantially constant.

SUMMARY OF THE INVENTION

An embodiment of the present invention that is described herein provides an apparatus including an optical ring resonator, first and second optical couplers, and control circuitry. The first optical coupler is configured to modulate an input optical signal traversing an optical waveguide, by tuning the energy cross-coupling between the optical waveguide and the ring resonator with a first variable coupling coefficient. The second optical coupler is configured to tune the energy cross-coupling between the ring resonator and an auxiliary optical signal, different from the input optical signal, with a second variable coupling coefficient. The control circuitry is configured to modulate the first coupling coefficient with a first control signal so as to modulate the input optical signal, and to modulate the second coupling coefficient with a second control signal, so as to retain a constant electrical-field complex envelope in the ring resonator.

In some embodiments, the input optical signal and the auxiliary optical signal are produced by splitting an optical signal from a single optical source, or by different but phase-locked optical sources. In an embodiment, the modulated input signal is the output of the same optical coupler over which the input optical signal is received. In a disclosed embodiment, the control circuitry is configured to derive the second control signal from the first control signal. In another embodiment, the control circuitry is configured to pre-charge the optical ring resonator to a critical coupling state.

In an embodiment, the control circuitry is configured to modulate the first coupling coefficient with a digital modulating signal. In an alternative embodiment, the control circuitry is configured to modulate the first coupling coefficient with an analog modulating signal. In an embodiment, the control circuitry is configured to modulate the second coupling coefficient with a digital modulating signal. In an alternative embodiment, the control circuitry is configured to modulate the second coupling coefficient with an analog modulating signal. In a disclosed embodiment, the optical ring resonator and the first and the second optical couplers are fabricated in a silicon photonics integrated circuit (Si PIC).

There is additionally provided, in accordance with an embodiment of the present invention, a method including modulating an input optical signal traversing an optical waveguide, by tuning cross-coupling of the energy between the optical waveguide and an optical ring resonator with a first variable coupling coefficient. Cross-coupling of the energy between the ring resonator and an auxiliary optical signal, different from the input optical signal, is tuned with a second variable coupling coefficient. The first coupling coefficient is modulated with a first control signal so as to modulate the input optical signal. The second coupling coefficient is modulated with a second control signal, so as to retain a constant electrical-field complex envelope in the ring resonator.

There is further provided, in accordance with an embodiment of the present invention, a method including fabricating an optical ring resonator. A first optical coupler having a first variable coupling coefficient is coupled to the ring resonator, for modulating an input optical signal traversing an optical waveguide by tuning the cross-coupling of the energy between the optical waveguide and the ring resonator. A second optical coupler having a second variable coupling coefficient is coupled to the ring resonator, for tuning the cross-coupling of the energy between the ring resonator and an auxiliary optical signal, different from the input optical signal. Control circuitry is connected to the first and the second couplers. The control circuitry modulates the first coupling coefficient with a first control signal so as to modulate the input optical signal, and modulates the second coupling coefficient with a second control signal so as to retain a constant electrical-field complex envelope in the ring resonator.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved EO microring modulator configurations. In some embodiments, an optical waveguide, which carries an input optical signal, is coupled to a ring resonator using a first optical coupler. The coupling coefficient of this coupler is modulated using a first control signal, so as to cross-couple a variable amount of energy between the input signal and the ring resonator and thus modulate the input signal.

When performing the above modulation process, the energy in the ring resonator decays over time, and this phenomenon degrades the modulation performance considerably. The methods and devices described herein solve this problem by coupling additional energy to the ring resonator from an additional auxiliary optical signal. As will be described in detail below, the ring resonator is also coupled to an auxiliary optical power channel via a second optical coupler. The coupling coefficient of the second coupler is modulated in a manner that retains a constant complex envelope of the electrical field of the optical signal in the ring resonator. Typically, the coupling coefficient of the second coupler is modulated using a second control signal, which is derived from the first control signal so as to meet the constant envelope condition.

In the disclosed embodiments, the input optical signal and the auxiliary optical signal are typically phase-locked to one another. In some embodiments, the input optical signal and the auxiliary optical signal may originate from the same optical source, whose output is split to produce the two signals. In other embodiments, the input optical signal and the auxiliary optical signal are generated using different, but phase-locked, optical sources. The two signals are then coupled to the ring resonator over separate optical waveguides and couplers. The modulated input signal is output from the modulator over the same optical coupler that is used for inputting the input optical signal.

Because of the above features, the EO modulator configurations described herein can achieve a smaller mechanical footprint, and also lend themselves for straightforward cascading of multiple modulators. Moreover, the amplitude of the auxiliary signal can be controlled independently of the input signal, which gives an additional degree of freedom that can be used to improve the modulation performance.

In comparison with conventional microring modulators, the disclosed configurations enable high modulation speed and depth that are not limited by the resonator Q factor.

Charge-Discharge EO Microring Configuration

Figure 1:
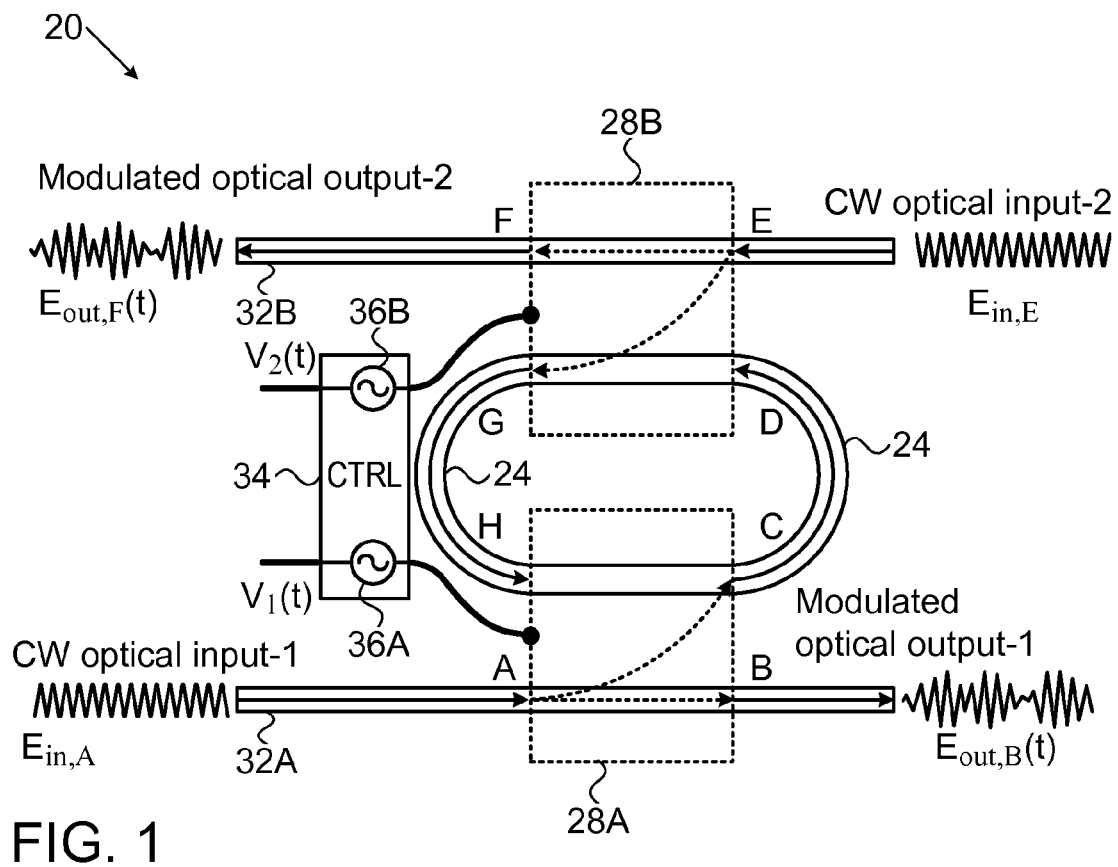
FIGS. 1 and 2 are block diagrams that schematically illustrate a microring Electro-Optical (EO) modulator, in accordance with an embodiment of the present invention.

FIG. 1 is a block diagram that schematically illustrates a microring Electro-Optical (EO) modulator 20, in accordance with an embodiment of the present invention. Modulator 20 comprises a ring resonator 24, two tunable optical couplers 28A and 28B, and two optical waveguides 32A and 32B.

In one example embodiment, modulator 24 is fabricated on a silicon substrate using silicon photonics integrated circuit (Si PIC) technology, resonator 24 has a radius of several μm, and couplers 28A and 28B comprise Mach-Zehnder Modulators (MZMs). Alternatively, however, any other suitable implementation can be used.

The electrical-field amplitudes at the various ports of couplers 28A and 28B are denoted A ... H in the figure. The same letters are also used to refer to the ports themselves, for clarity.

In the present example, a Continuous Wave (CW) input optical signal to be modulated traverses waveguide 32A and enters coupler 28A at port A. Ring resonator 24 and waveguide 32A are mutually coupled to one another, and the coupling is determined by the coupling coefficients of coupler 28A. The cross-coupling can be written in matrix form as $$\begin{bmatrix} B \\ C \end{bmatrix} = \begin{bmatrix} \sigma_{11,1} & \kappa_{12,1} \\ \kappa_{21,1} & \sigma_{22,1} \end{bmatrix} \begin{bmatrix} A \\ H \end{bmatrix} \quad (1)$$

wherein the $A \Rightarrow B$ and $A \Rightarrow C$ coupling coefficients of coupler 28A are denoted $\sigma_{11,1}$ and $\kappa_{21,1}$, respectively, and the $H \Rightarrow B$ and $H \Rightarrow C$ coupling coefficients of coupler 28A are denoted $\sigma_{22,1}$ and $\kappa_{12,1}$, respectively. We further define $\sigma_1 \triangleq \sqrt{|\sigma_{11,1} \cdot \sigma_{22,1}|}$, $\kappa_1 \triangleq \sqrt{|\kappa_{12,1} \cdot \kappa_{21,1}|}$.

The coupling coefficients of coupler 28A are modulated by a Radio Frequency (RF) signal $v_1(t)$, also referred to as a control signal or modulating signal. Signal $v_1(t)$ is produced by a signal source 36A, external to the modulator. As a result, a time-varying portion of the power of the input signal is removed from waveguide 32A and coupled into ring resonator 24, and a time-varying portion of the power of the ring resonator signal is removed from the ring resonator and coupled to port B of coupler 28A. The remaining optical signal in waveguide 32A interferes with the coupled optical signal from ring resonator 24, and this time-varying interference is provided as output on port B. The remaining optical signal in ring resonator 24 interferes with the coupled optical signal from waveguide 32A, and this time-varying interference is provided on port C.

In order to prevent the energy level in ring resonator 24 from decaying, an additional time-varying amount of energy is coupled into the ring resonator via coupler 28B. For this purpose, an additional optical signal, referred to as an auxiliary signal, is transmitted via waveguide 32B into coupler 28B. The $E \Rightarrow F$ and $E \Rightarrow G$ coupling coefficients of coupler 28B are denoted $\sigma_{11,2}$ and $\kappa_{21,2}$, respectively, and the $D \Rightarrow F$ and $D \Rightarrow G$ coupling coefficients of coupler 28B are denoted $\kappa_{12,2}$ and $\sigma_{22,2}$, respectively. We further define $\kappa_2 \triangleq \sqrt{|\kappa_{12,2} \cdot \kappa_{21,2}|}$, $\sigma_2 \triangleq \sqrt{|\sigma_{11,2} \cdot \sigma_{22,2}|}$.

The coupling coefficients of coupler 28B are modulated by an RF signal $v_2(t)$. Signal $v_2(t)$ is produced by a signal source 36B. Modulation of the coupling coefficients of coupler 28A tunes the cross-coupling of energy between the ring resonator and the input optical signal. Similarly, modulation of the coupling coefficients of coupler 28B tunes the cross-coupling of energy between the ring resonator and the auxiliary optical signal.

Typically, signal $v_2(t)$ is derived from signal $v_1(t)$, such that the complex envelope of the electrical field of the optical signal in ring resonator 24 remains constant as a function of time. Generation of $v_2(t)$ is addressed in greater detail below. The input optical signal (entering at port A) and the auxiliary optical signal (entering at port E) may be generated by separate phase-locked optical sources or by splitting an optical signal from a single optical source (not shown in the figure).

In the present example, signals $v_1(t)$ and $v_2(t)$ are generated in control circuitry 34, which is external to modulator 20 and comprises signal sources 36A and 36B.

Figure 2:
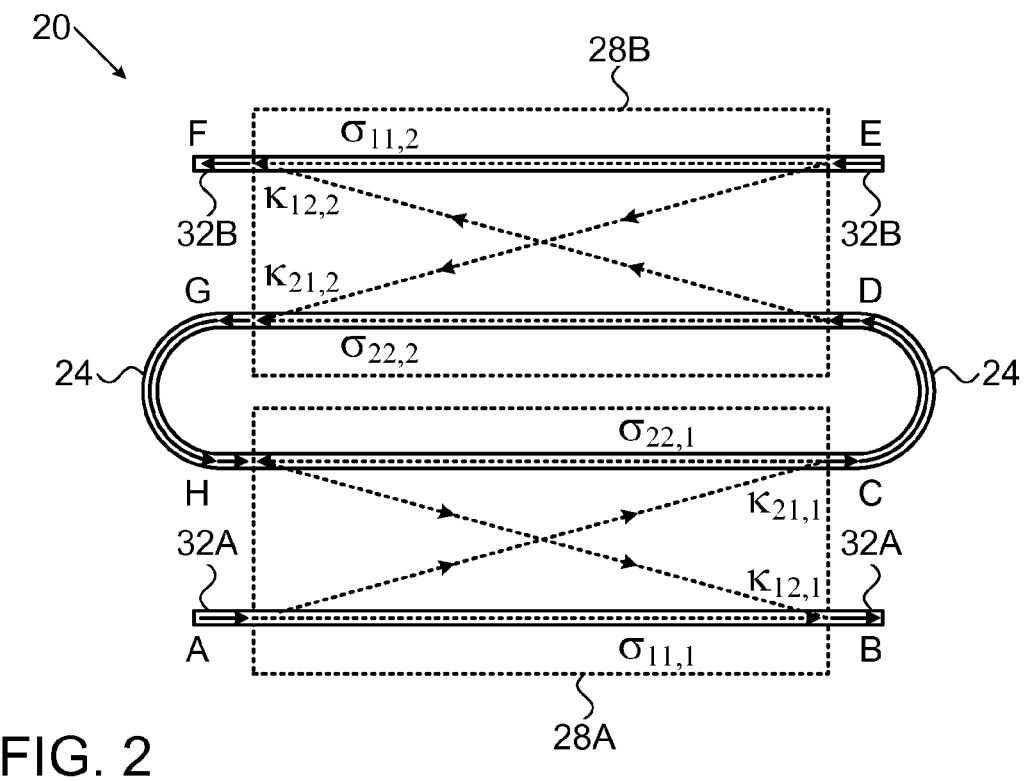

FIG. 2 is another block diagram that schematically illustrates a microring EO modulator 20, in accordance with an embodiment of the present invention. This figure details the coupling coefficients of couplers 28A and 28B as they are used in the description that follows. The four coupling coefficients of coupler 28A are denoted $\kappa_{12,1}$, $\kappa_{21,1}$, $\sigma_{11,1}$, and $\sigma_{22,1}$, and the four coupling coefficients of coupler 28B are denoted $\kappa_{12,2}$, $\kappa_{21,2}$, $\sigma_{11,2}$ and $\sigma_{22,2}$.

The relationship between the various coupling coefficients and electrical-field amplitudes in modulator 20 can be written as follows:

$$\begin{bmatrix} B(t) \\ C(t) \end{bmatrix} = \begin{bmatrix} \sigma_{11,1} & \kappa_{12,1} \\ \kappa_{21,1} & \sigma_{22,1} \end{bmatrix} \begin{bmatrix} A \\ H(t) \end{bmatrix} \quad (2)$$

$$H(t) = \alpha_0 e^{-i\theta_2} G(t - \tau_0)$$

$$\begin{bmatrix} F(t) \\ G(t) \end{bmatrix} = \begin{bmatrix} \sigma_{11,2}(t) & \kappa_{12,2}(t) \\ \kappa_{21,2}(t) & \sigma_{22,2}(t) \end{bmatrix} \begin{bmatrix} E \\ D(t) \end{bmatrix}$$

$$D(t) = \alpha_0 e^{-i\theta_1} C(t - \tau_0)$$

wherein $\alpha_0$ and denotes the transmission (or attenuation) along half the ring resonator (from C to D or from G to H), $t_0$ denotes the propagation time along half the ring resonator (from C to D or from G to H), $\theta_1$ denotes the phase accumulation along the section of the ring resonator from C to D, and $\theta_2$ denotes the phase accumulation along the section of the ring resonator from G to H.

For achieving perfect modulation, the electrical field complex amplitude H should be constant during the modulation process, i.e., $H(t \geq 0) = H_{cc}$. Assuming this condition is met just before $t=0$, we can write this condition as $$H(t_0) = \alpha_0 e^{-i\theta_2} G(t_0 - \tau_0) \quad (3)$$

$$= \alpha_0 e^{-i\theta_2} \begin{bmatrix} \sigma_{22,2}(t_0 - \tau_0)\alpha_0 e^{-i\theta_1} \times \\ (\kappa_{21,1}(t_0 - 2\tau_0)A + \sigma_{22,1}(t_0 - 2\tau_0)H_{cc}) + \\ \kappa_{21,2}(t_0 - \tau_0)E \end{bmatrix} = H_{cc}$$

In order to meet $H=H_{cc}$ immediately before initiating modulation, control circuitry 34 pre-charges ring resonator 24 with energy before initiating modulation, to a state of critical coupling, i.e., using $\kappa_1(t<0)=\kappa_{cc}$ and $\kappa_2(t<0)=0$. Critical coupling is achieved in the ring resonator when $\kappa_2=0$ and $\kappa_1=\kappa_{cc}=\sqrt{1-\alpha^2}$, wherein $\alpha$ denotes the full ring round-trip transmission.

Equation (3) above yields the following quadratic equation for $\kappa_2(t)$:

$$\kappa_2(t) = \frac{-b(t-\tau_0) - \sqrt{b^2(t-\tau_0) - 4a(t-\tau_0)c(t-\tau_0)}}{2a(t-\tau_0)} \quad (4)$$

$$a(t-\tau_0) = f_a(\kappa_1(t-\tau_0))$$
$$= \kappa_{cc}^2 + \kappa_{cc}^2 \kappa_1^2(t-\tau_0)\sigma_{cc} + 2\kappa_{cc}\kappa_1(t-\tau_0)\sigma_{cc}^2\sigma_1(t-\tau_0) + \sigma_1^2(t-\tau_0)\sigma_{cc}^2$$

$$b(t-\tau_0) = f_b(\kappa_1(t-\tau_0)) = -2\sigma_{cc}^{\frac{1}{2}}\kappa_{cc}$$

$$c(t-\tau_0) = f_c(\kappa_1(t-\tau_0))$$
$$= \sigma_{cc} - \kappa_{cc}^2\kappa_1^2(t-\tau_0)\sigma_{cc} - 2\kappa_{cc}\kappa_1(t-\tau_0)\sigma_{cc}^2\sigma_1(t-\tau_0) - \sigma_1^2(t-\tau_0)\sigma_{cc}^3$$

wherein, as defined above, $\sigma_i \triangleq \sqrt{|\sigma_{11,i} \cdot \sigma_{22,i}|}$ and $\kappa_i \triangleq \sqrt{|\kappa_{12,i} \cdot \kappa_{21,i}|}$, $i \in [1,2]$.

As can be seen in Equation (4), coefficients a, b and c of the quadratic equation are all functions of $\kappa_1(t-\tau_0)$. In other words, Equation (4) gives the relation that should be maintained between $\kappa_2$ and $\kappa_1$ in order to maintain H constant over time. In some embodiments, control circuitry 34 derives signal $v_2(t)$ from signal $v_1(t)$ in accordance with the relation required by Equation (4). When signals $v_1(t)$ and $v_2(t)$ meet this condition, energy decay is perfectly compensated for: the auxiliary optical signal compensates exactly for the energy lost in the resonator as a result of modulating the input optical signal.

The disclosed modulator configurations can be used for modulating optical signals using modulating signals of various kinds, including high-speed digital signals and wideband analog signals. Example simulation results that demonstrate the modulator performance are given below. The modulator configurations described above are depicted purely by way of example. In alternative embodiments, any other suitable configurations can be used.

Example Simulated Performance

Figure 3A:
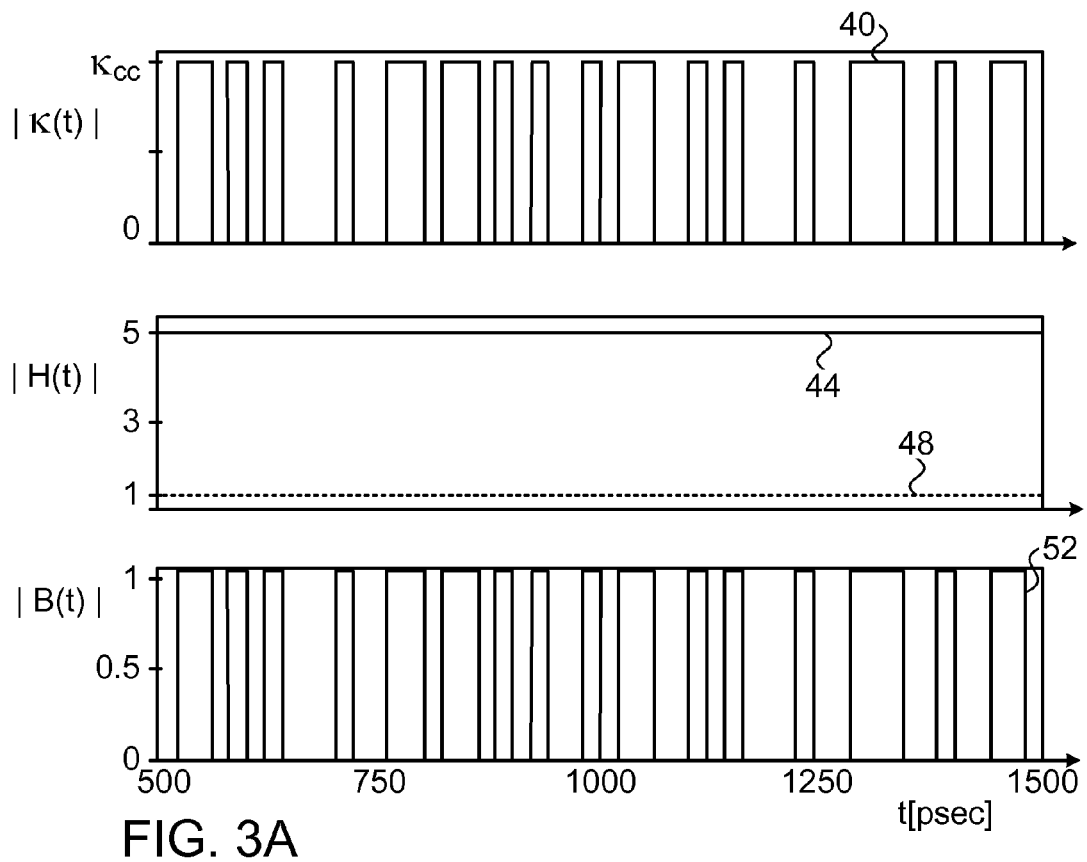
FIGS. 3A and 3B are graphs showing simulated performance of microring EO modulators, in accordance with an embodiment of the present invention.
Figure 3B:
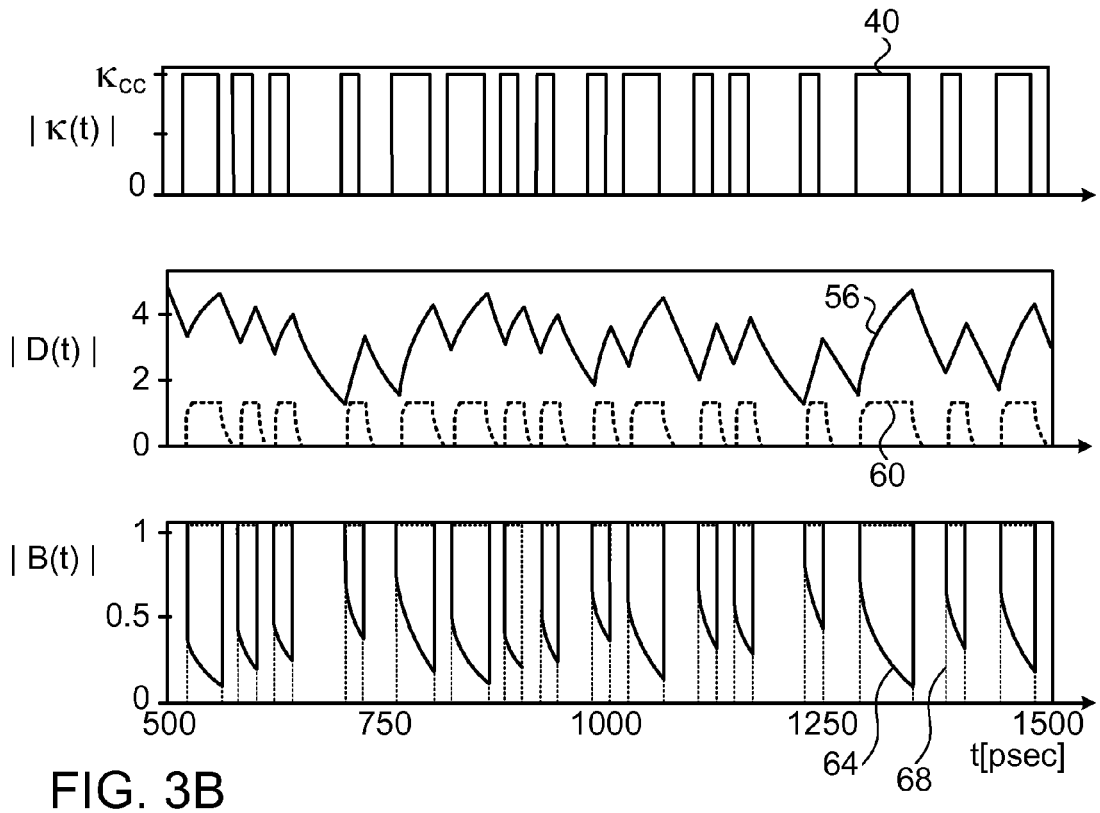

FIGS. 3A and 3B are graphs showing simulated performance of microring EO modulators, in accordance with an embodiment of the present invention. FIG. 3A shows the performance of modulator 20 of FIGS. 1 and 2 above. For comparison, FIG. 3B shows the performance of a conventional single-coupled microring modulator having a single optical coupler and no auxiliary optical signal.

In both figures, the modulating signal $v_1(t)$ is a 50 Gbps binary On-Off Keying (OOK) digital signal that causes the coupling coefficients of couplers 28A and 28B to alternate between zero and critical coupling $\kappa_{cc}$. A plot 40 at the top of each figure shows the magnitude of the modulated coupling coefficient of coupler 28A.

The middle graph in FIG. 3A shows the magnitude of H(t) for two scenarios. A solid curve 44 shows H(t) for a Cavity Decay Time (CDT) of 52 pS and a quality factor $Q=200 \cdot 10^3$, and a dashed curve 48 shows H(t) for CDT=4 pS and $Q=21 \cdot 10^3$. (The CDT is defined as CDT=$-\tau \cdot \ln(\alpha)$, wherein $\tau$ denotes the ring round-trip time and $\alpha$ denotes the ring round-trip transmission.) As can be seen in the figure, H(t) is indeed constant, i.e., the energy level in the ring remains constant during the modulation process without energy decay.

For comparison, the middle graph in FIG. 3B shows the electrical-field magnitude in a conventional single-coupled ring resonator under the same conditions. A solid curve 56 refers to CDT=52 pS and $Q=200 \cdot 10^3$, and a dashed curve 60 refers to CDT=4 pS and $Q=21 \cdot 10^3$. As can be appreciated, the energy level in the single-coupled ring resonator varies considerably during modulation.

The impact of this phenomenon on the modulation quality can be appreciated by examining the output modulated optical signal B(t). The bottom graph in FIG. 3A shows B(t) for CDT=52 pS and $Q=200 \cdot 10^3$ and for CDT=4 pS and $Q=21 \cdot 10^3$ (both fall on a single curve 52). The modulation is highly accurate and without distortion.

For comparison, the bottom graph in FIG. 3B shows B(t) for a single-coupled ring resonator, for CDT=52 pS and Q=200·10³ (solid curve 64) and for CDT=4 pS and Q=21·10³ (dashed curve 68). It can be seen clearly that the modulation quality is severely degraded.

Figure 4:
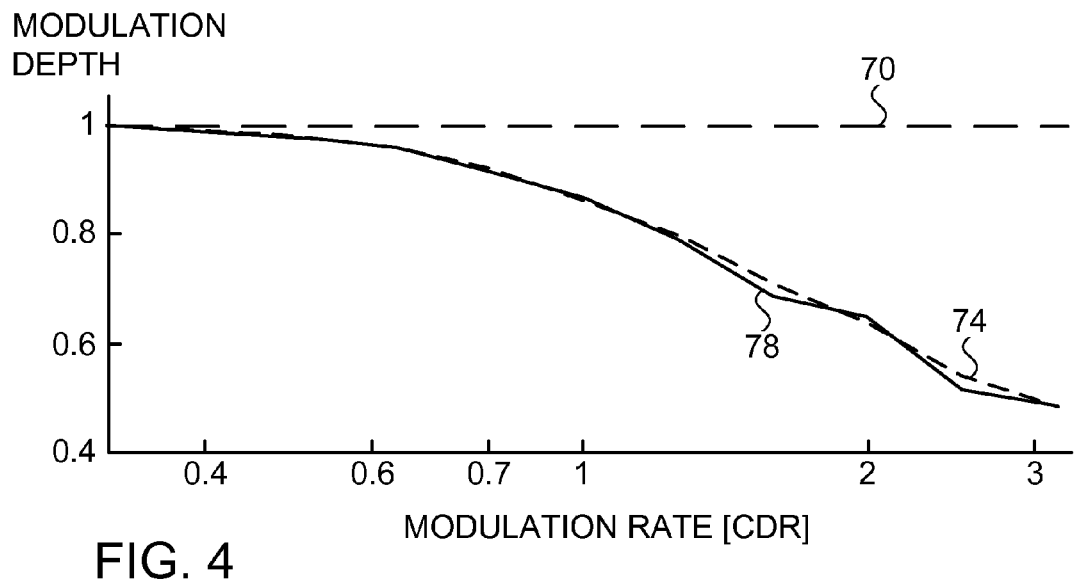
FIG. 4 is a graph showing simulated modulation depths of microring EO modulators, in accordance with an embodiment of the present invention.

FIG. 4 is a graph showing simulated modulation depths of microring EO modulators, in accordance with an embodiment of the present invention. The modulation depth is shown as a function of modulation rate (in units of Cavity Decay Rate—CDR—defined as $CDT^{-1}$). A plot 70 shows the performance of the disclosed modulator configurations (for {CDT=4 pS, Q=21·10³} and {CDT=52 pS, Q=200·10³}, both falling of the same curve). Plots 74 and 78 show the performance of a conventional single-coupled ring resonator for {CDT=4 pS, Q=21·10³} and {CDT=52 pS, Q=200·10³}, respectively. As can be seen in the figure, the modulation depth of a single-coupled resonator deteriorates rapidly with modulation rate, whereas the modulation depth of disclosed modulator remains constant at unity.

Figure 5:
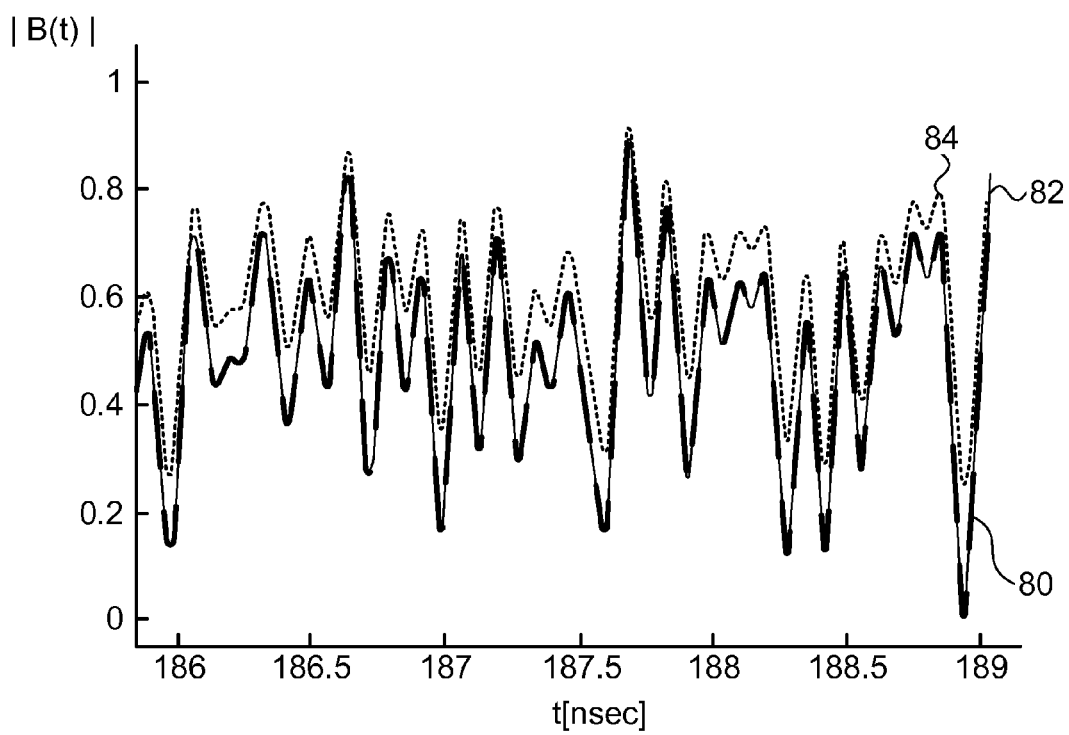
FIG. 5 is a graph showing simulated performance of microring EO modulators modulated with an Orthogonal Frequency Division Multiplexing (OFDM) signal, in accordance with an embodiment of the present invention.

FIG. 5 is a graph showing simulated performance of microring EO modulators, when modulated with an Orthogonal Frequency Division Multiplexing (OFDM) signal, in accordance with an embodiment of the present invention. In the present example, the modulating signal is a 1024-subcarrier analog OFDM signal whose total bandwidth is 50 GHz.

A curve 80 shows the theoretical time-domain modulation response, irrespective of Q factor. A curve 82 shows the modulated signal B(t) when using the disclosed modulator. A curve 84 shows the modulated signal B(t) when using a conventional single-coupled resonator modulator. As can be seen from this comparison, the disclosed modulator produces a modulated signal that exactly fits the theoretical result, without suffering from resonator memory effects or other impairments. The conventional modulator exhibits deviations from the theoretical curve.

The simulation results shown above are depicted purely by way of example. Additional simulated performance results are given in U.S. Provisional Patent Application 61/811,819, cited above.

Although the embodiments described herein mainly address optical modulation, the methods and systems described herein can also be used in other applications, such as for broadband RF modulation in Radar, Electronic Warfare (EW) or remote antenna systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
an optical ring resonator;
a first optical coupler, which is configured to modulate an input optical signal traversing an optical waveguide, by tuning cross-coupling of energy between the optical waveguide and the ring resonator with a first variable coupling coefficient;
a second optical coupler, which is configured to tune cross-coupling of energy between the ring resonator and an auxiliary optical signal, different from the input optical signal, with a second variable coupling coefficient; and
control circuitry, which is configured to modulate the first coupling coefficient with a first control signal so as to modulate the input optical signal with a time-varying magnitude, to derive a second control signal from the first control signal, and to modulate the second coupling coefficient with a second control signal, wherein the second control signal is derived from the first control signal using a relation that retains a constant electrical-field complex envelope in the ring resonator regardless of the time-varying magnitude with which the input optical signal is modulated.

2. The apparatus according to claim 1, wherein the input optical signal and the auxiliary optical signal are produced by splitting an optical signal from a single optical source, or by different but phase-locked optical sources.

3. The apparatus according to claim 1, wherein the modulated input signal is output from the same optical coupler over which the input optical signal is received.

4. The apparatus according to claim 1, wherein the control circuitry is configured to pre-charge the optical ring resonator to a critical coupling state.

5. The apparatus according to claim 1, wherein the control circuitry is configured to modulate the first coupling coefficient with a digital modulating signal.

6. The apparatus according to claim 1, wherein the control circuitry is configured to modulate the first coupling coefficient with an analog modulating signal.

7. The apparatus according to claim 1, wherein the control circuitry is configured to modulate the second coupling coefficient with a digital modulating signal.

8. The apparatus according to claim 1, wherein the control circuitry is configured to modulate the second coupling coefficient with an analog modulating signal.

9. The apparatus according to claim 1, wherein the optical ring resonator and the first and second optical couplers are fabricated in a silicon photonics integrated circuit (Si PIC).

10. A method, comprising:
modulating an input optical signal traversing an optical waveguide, by tuning cross-coupling of energy between the optical waveguide and an optical ring resonator with a first variable coupling coefficient;
tuning cross-coupling of energy between the ring resonator and an auxiliary optical signal, different from the input optical signal, with a second variable coupling coefficient;
modulating the first coupling coefficient with a first control signal so as to modulate the input optical signal with a time-varying magnitude;
deriving a second control signal from the first control signal; and
modulating the second coupling coefficient with a second control signal,
wherein the second control signal is derived from the first control signal using a relation that retains a constant electrical-field complex envelope in the ring resonator regardless of the time-varying magnitude with which the input optical signal is modulated.

11. The method according to claim 10, wherein the input optical signal and the auxiliary optical signal are produced by splitting an optical signal from a single optical source, or by different but phase-locked optical sources.

12. The method according to claim 10, wherein modulating the input optical signal comprises outputting the modulated input signal over the same optical coupler over which the input optical signal is received.

13. The method according to claim 10, and comprising pre-charging the optical ring resonator to a critical coupling state.

14. The method according to claim 10, wherein modulating the first coupling coefficient comprises applying to the first optical coupler a digital modulating signal.

15. The method according to claim 10, wherein modulating the first coupling coefficient comprises applying to the first optical coupler an analog modulating signal.

16. The method according to claim 10, wherein modulating the second coupling coefficient comprises applying to the second optical coupler a digital modulating signal.

17. The method according to claim 10, wherein modulating the second coupling coefficient comprises applying to the second optical coupler an analog modulating signal.

18. The method according to claim 10, wherein the optical ring resonator and the first and second optical couplers are fabricated in a silicon photonics integrated circuit (Si PIC).

\* \* \* \* \*